United States Patent [19]

Frazier et al.

[11] Patent Number: 5,122,201
[45] Date of Patent: Jun. 16, 1992

[54] WATER-SOLUBLE SOLDER FLUX

[75] Inventors: Janice D. Frazier, San Jose, Calif.; Clement A. Okoro, Round Rock, Tex.; Katherine J. Pearsall; Richard A. Reich, both of Georgetown, Tex.; James R. White, Round Rock, Tex.

[73] Assignee: International Business Machines Corporation, Armonk, N.Y.

[21] Appl. No.: 794,542

[22] Filed: Nov. 19, 1991

[51] Int. Cl.$^5$ .............................................. B23K 35/34
[52] U.S. Cl. ...................................... 148/23; 148/24; 148/26
[58] Field of Search .................................... 148/23–26

[56] References Cited

U.S. PATENT DOCUMENTS 3,597,285  3/1971  Aronberg .............................. 148/25
3,925,112  12/1975  Peterson ............................... 148/25

Primary Examiner—Peter D. Rosenberg
Attorney, Agent, or Firm—Duke W. Yee

[57] ABSTRACT

The composition of the present invention includes a water-soluble soldering flux requiring no thermal energy to place the water-soluble flux in an active state. The water-soluble soldering flux contains (1) from about 1 percent to about 5 percent by weight, based on the weight of the water-soluble soldering flux, of an inorganic acid which, in solution, forms anions of the acid having a low propensity for forming metal complexes; (2) from about 30 percent to about 70 percent by weight, based on the total weight of the water-soluble soldering flux, of an anionic surfactant; and (3) from about 30 percent to about 70 percent by weight, based on the total weight of the water-soluble soldering flux, of a diluent. The composition of the present invention may contain a fourth component, a viscosity modifier from about 5 percent to about 40 percent by weight, based on total weight of the water-soluble soldering flux.

8 Claims, No Drawings

WATER-SOLUBLE SOLDER FLUX

BACKGROUND OF THE INVENTION

1. Field of the Invention

The present invention relates in general to an improved water-soluble solder flux and in particular to an improved water-soluble solder flux for rework or repair of circuit boards. Still more particularly the present invention relates to a water-soluble solder flux that does not require thermal activation and does not undergo significant chemical changes at repair temperatures and minimizes corrosive processes on a solder when utilized with the solder.

2. Description of the Related Art

In producing printed circuit boards the primary attachment and the rework/repair of components for these printed circuit boards have been accomplished utilizing rosin-based solder pastes and rework/repair fluxes. These organic, rosin systems require nonaqueous solvents, such as chlorofluorocarbons ("CFC"), for proper cleaning after the attachment or rework/repair of components.

Solder paste contains a flux as a component. Solder powder is suspended in the flux. This flux component of the solder paste is the material that controls many of the requirements of the solder paste. For example, the flux must remove metal oxides from the solder powder to allow reflow of all the solder properly.

The solder paste is screened onto a circuit board using an appropriately patterned stencil, in all of the locations requiring connection of components to copper pads. Next, components are placed on the circuit board on the prepared sites. The solder paste must be tacky enough to hold the components in their required location until the board is subject to reflow, at which time the solder paste flows to become the soldered connection for the components. Reflow is the term used to describe heating the solder above its melting temperature to give a soldered joint.

In producing printed circuit boards, testing of the boards is made, visually or through instruments, to find defects before sending the printed circuit board for shipment. Rework or repair includes any necessary repairs performed manually by operators after inspection of the completed circuit board.

Current solder pastes utilized in the industry have a flux system composed of a complex mixture derived from a natural product based pine-tar distillate fraction (called rosin). This rosin-based flux system requires an organic solvent to clean the flux residue after reflow, the heating of the solder above its melting temperature to give a soldered joint. The best solvent for cleaning is a halogenated hydrocarbon. With the current desire to decrease the use of halogenated hydrocarbons, this type of flux becomes less desirable.

Recently, in a global effort to curtail CFC emissions, water-soluble solder pastes and water-soluble rework/repair fluxes have been introduced which may be cleaned sufficiently with aqueous cleaners.

In most cases, however, at least some level of residual flux is left behind. These residues have the potential to corrode the solder joints, creating a concern regarding reliability. In the field of repair and rework fluxes, this potential to corrode solder joints is a particularly important one for two reasons. First, the time between repair/rework and cleaning is typically longer than the time between primary attachment and cleaning. In primary attachment, cleaning is usually performed within ten minutes of the attachment. On the other hand, several hours may follow between rework/repair and cleaning. Next, a low melt tin-lead-indium solder is utilized for pin-in-hole component rework. This solder has a greater propensity to corrode than the normal tin lead eutectic solder.

In water-soluble solder fluxes, the activator components promotes the corrosion of the solder. Typical activator are either hydrohalide derivatives such as dimethylamine hydrochloride or organic acids such as glycolic acid (hydroxyacetic acid). Presently water-soluble solder fluxes require thermal activation to produce the "active" state of the activator components.

It would, therefore, be desirable to have a water-soluble solder flux that does not cause corrosion of solder joints during rework or repair of circuit boards and that does not require thermal activation.

SUMMARY OF THE INVENTION

It is one object of the present invention to provide an improved water-soluble solder flux for rework or repair of circuit boards.

It is another object of the present invention to provide a water-soluble solder flux that does not require thermal activation.

It is yet another object of the present invention to provide a water-soluble solder flux that does not undergo significant chemical changes at rework or repair temperatures and minimizes corrosive processes on a solder when utilized with the solder.

The composition of the present invention includes a water-soluble soldering flux requiring no thermal energy to place the water-soluble flux in an active state. The water-soluble soldering flux contains (1) from about 1 percent to about 5 percent by weight, based on the weight of the water-soluble soldering flux, of an inorganic acid which, in solution, forms anions of the acid having a low propensity for forming soluble metal complexes and thus creating a passive film on the solder to prevent or minimize solder corrosion; (2) from about 30 percent to about 70 percent by weight, based on the total weight of the water-soluble soldering flux, of an anionic surfactant; and (3) from about 30 percent to about 70 percent by weight, based on the total weight of the water-soluble soldering flux, of a diluent. The composition of the present invention may contain a fourth component, a viscosity modifier from about 5 percent to about 40 percent by weight, based on total weight of the water-soluble soldering flux.

The above as well as additional objects, features, and advantages of the invention will become apparent in the following detailed description.

DETAILED DESCRIPTION OF THE INVENTION

Low melt tin-lead-indium solder is utilized in rework/repair. This type of solder has a greater propensity to corrode than a SnPb eutectic solder.

In a water-soluble solder flux, it is the activator component that promotes corrosion of solder. Corrosion products observed for tin-lead-indium solder are generally indium salts. The mechanism of corrosion is related to the ability of the anions of the activators (chloride ion for dimethylamine hydrochloride and glycolate ion for glycolic acid) to complex indium. The dissolution of the native oxide for indium in the presence of an acid, HA, is shown in the following equation where "A" represents an anion, e.g., chloride or glycolate.

$$In_2O_3 + 6HA \rightarrow 2InA_2^+ + 3H_2O + 2A^-$$

The activity of the flux is generally related to the strength of the acid, HA. On the other hand, the corrosion potential is related to the ability of the anion to form indium complexes such as $InA_2^+$.

The present invention is a water-soluble solder flux for use in rework/repair comprised of three main components: (1) an inorganic acid, (2) a surfactant, and (3) a diluent. The inorganic acid utilized in the present invention is selected such that the anion of the acid, in solution, has a low propensity of forming soluble metal complexes. As a result, the water soluble solder flux of the invention creates a passive film on the solder to prevent or minimize solder corrosion, thus being compatible with tin-lead-indium solder as well as with SnPb eutectic solder. The water-soluble flux under a preferred embodiment of the present invention contains the inorganic acid in a proportion from about 1% to about 5% by weight, based on the weight of the water-soluble soldering flux. Some examples of inorganic acids that may be utilized under a preferred embodiment of the present invention are phosphoric acid and boric acid.

The surfactant in the present invention is preferably an anionic surfactant which contains a polar group that may be a carboxylic acid, a sulfonic acid, a phosphoric acid, a sulfate monoester, a phosphate monoester, a phosphate diester, a phosphate triester, or mixtures thereof. The above described polar group may be attached to a moiety selected from the group consisting of an alkoxy, an aryloxy group, an alkaryloxy, a poly(alkyleneoxide) group, or adducts thereof or any combination thereof. The above described polar group may be attached to a moiety of the structure:

$$R_1—O—$$

$R_1$ is a straight or branched chain alkyl group having 1 to 12 carbon atoms, preferably 8 carbons.

The above described $R_1$—O— polar group may be attached to a moiety of the structure:

$$R_2—C_6H_4—(OCH_2CH_2)_n—O$$

where $R_2$ is a straight branch or chain alkyl group having 1 to 12 carbon atoms and n=4-15. The most preferred structure is where R is a straight or branch chain alkyl group containing 9 carbon atoms and n=8-11. Chemicals containing a polar group include the following commercially available products: GAFAC RE610, GAFAC RE-410, available from GAF Corporation under trade names GAFAC RE-610 and GAFAC RE-410, WAYFOS D-10-N, and WAYFOS M-100 (available from Olin Corporation under trade names WAYFOS D-10-N and WAYFOS N-100).

The surfactant functions both as a flux vehicle, providing a means of dissolving reaction products and debris and as an aid in cleaning. Under a preferred embodiment of the present invention, the water-soluble soldering flux contains the anionic surfactant in a proportion from about 30% to 70% by weight, based on the total weight of the water-soluble soldering flux. Surfactants for use in a preferred embodiment of the present invention are shown in Table 1 below:

TABLE 1

| Name | Composition | N | M/D |
|---|---|---|---|
| Gafac RE-610 | nonylphenoxypolyethyleneoxide phosphate ester | 9 | 55/44 |
| Gafac RE-410 | nonylphenoxypolyethyleneoxide phosphate ester | 4 | 54/46 |
| Wayfos M100 | nonylphenoxypolyethyleneoxide phosphate ester | 10 | 42/58 |
| Gafac RE-610 | nonylphenoxypolyethyleneoxide phosphate ester | 10 | 60/40 |
| Sandopan MA-18 | nonylphenoxypolyethyleneoxide carboxylic acid | | |

N = number of carbon atoms
M/D = ratio of mono to diester

Most of these surfactants are thermally stable at typical soldering temperatures (i.e., less than 250° C.). This temperature range of less then 250° C. covers temperatures encountered in solder fountain repair, but may not be inclusive for all hand soldering iron repair.

The diluent component under a preferred embodiment of the present invention is a low molecular weight aliphatic alcohol having from about 1 to 4 carbon atoms although polyhydroxy alcohols such as dipropylene glycol can also function as the diluent. Specifically, some aliphatic alcohols that may be used in a preferred embodiment of the present invention include methyl alcohol, ethyl, isopropyl alcohol, n-propyl alcohol, isobutyl alcohol, and n-butyl alcohol. The water-soluble soldering flux under a preferred embodiment of the present invention contains the diluent in a proportion from about 30% to about 70% by weight, based on the total weight of the water-soluble soldering flux.

In another preferred embodiment of the present invention, a fourth component is utilized to increase the viscosity of the water-soluble solder flux when suitable viscosity cannot be achieved by the three main components described above. Furthermore, this fourth component, a viscosity modifier, may also function as a flux vehicle. Under one embodiment of the present invention, the water-soluble soldering flux contains a viscosity modifier in a proportion from about 5% to about 40% by weight, based on the total weight of the water-soluble soldering flux in addition to the aliphatic alcohol diluent. Some examples of suitable viscosity modifiers for use in a preferred embodiment of the present invention are glycerol and dipropylene glycol.

This water-soluble solder flux under a preferred embodiment of the present invention is thermally stable. That is, the components of the water-soluble solder flux in the present invention do not undergo significant chemical changes at repair temperatures. Furthermore, under the present invention, the fluxes do not require thermal activation because all of the components are liquids and are in their active state at room temperature. This characteristic is a significant advantage over prior fluxes, which generally require thermal activation to produce the active state of the activator component.

The following examples are various formulations of water-soluble solder fluxes under preferred embodiments of the present invention. Example 1 is the most preferred embodiment under the present invention.

| EXAMPLE 1 | |
|---|---|
| Gafac RE610 | 33% |
| phosphoric acid | 4% |
| isopropyl alcohol | 63% |
| EXAMPLE 2 | |
| Gafac RE610 | 66% |

-continued

| | |
|---|---|
| dipropylene glycol | 31% |
| phosphoric acid | 3% |

EXAMPLE 3

| | |
|---|---|
| Gafac RE610 | 42% |
| isopropyl alcohol | 46% |
| dipropylene glycol | 8% |
| phosphoric acid | 4% |

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A water-soluble soldering flux requiring no thermal energy to place the water-soluble flux in an active state, and minimizing corrosion processes on a solder when utilized with the solder comprising:
   from about 1 percent to about 5 percent by weight, based on the weight of the water-soluble soldering flux, of an inorganic acid which, in solution, forms anions of the acid having a low propensity for forming metal complexes;
   from about 30 percent to about 70 percent by weight, based on the total weight of the water-soluble soldering flux, of an anionic surfactant; and
   from about 30 percent to about 70 percent by weight, based on the total weight of the water-soluble soldering flux, of a diluent.

2. The water-soluble soldering flux of claim 1, wherein the inorganic acid is selected from a group consisting of phosphoric acid and boric acid.

3. The water-soluble soldering flux of claim 1, wherein the diluent is a low molecular weight alcohol.

4. The water-soluble soldering flux of claim 1, wherein the diluent is an aliphatic alcohol having about 1 to 4 carbon atoms.

5. The water-soluble soldering flux of claim 1, wherein the diluent alcohol is an aliphatic alcohol selected from the group consisting of methyl alcohol, ethyl alcohol, isopropyl alcohol, n-propyl alcohol, isobutyl alcohol and n-butyl alcohol.

6. The water-soluble soldering flux of claim 1, wherein the anionic surfactant selected from the group consisting of nonylphenoxypolyethyleneoxide phosphate esters and nonylphenoxypolyethyleneoxide carboxylic acids.

7. The water-soluble soldering flux of claim 6, wherein the inorganic acid, anionic surfactant and low molecular weight alcohol are all liquids at room temperature.

8. Water-soluble soldering flux requiring no thermal energy for activation, minimizing corrosion processes on a solder when utilized with solder comprising:
   from about 1 percent to about 5 percent by weight, based on total weight by the water-soluble soldering flux, of an inorganic acid which, in solution, forms anions of the acid, characterized by their low propensity for forming metal complexes with indium;
   from about 30 percent to about 70 percent by weight, based on the total weight of the water-soluble soldering flux, of an anionic surfactant which serves as a flux vehicle and which acts to dissolve reaction products and debris, the anionic surfactant being thermally stable at soldering temperatures in the range from about 120° C. to about 300° C.;
   from about 30 percent to about 70 percent by weight, based on the total weight of the water-soluble soldering flux, of a low molecular weight alcohol diluent; and
   from about 5 percent to about 40 percent by weight, based on the total weight of the water-soluble soldering flux, of a viscosity modifier selected from the group consisting of glycerol and dipropylene glycol; and
   wherein the inorganic acid, anionic surfactant, low molecular weight alcohol diluent, and viscosity modifier are all liquids at room temperature.

* * * * *